United States Patent [19]

Fluck

[11] Patent Number: 4,828,101

[45] Date of Patent: May 9, 1989

[54] APPARATUS FOR SEPARATING ARTICLE GROUPS OF VARIABLE LENGTH FROM A STACKED ARTICLE SERIES

[75] Inventor: René Fluck, Schleitheim, Switzerland

[73] Assignee: SIG Schweizerische Industrie-Gesellschaft, Neuhausen am Rheinfall, Switzerland

[21] Appl. No.: 731,955

[22] Filed: May 8, 1985

[30] Foreign Application Priority Data

May 9, 1984 [CH] Switzerland ............... 2270/84

[51] Int. Cl.⁴ .............................................. B65G 47/26
[52] U.S. Cl. .................... 198/429; 198/418.7; 53/542
[58] Field of Search ............... 198/424–426, 198/429, 430, 418; 414/48, 49, 80; 53/532, 542

[56] References Cited

U.S. PATENT DOCUMENTS

| 2,954,881 | 10/1960 | Hopton et al. | 198/418 |
| 3,037,610 | 6/1962 | Morton et al. | 198/429 |
| 4,018,031 | 4/1977 | Smaw | 198/425 |
| 4,098,392 | 7/1978 | Greene | 198/425 |

FOREIGN PATENT DOCUMENTS

| 0077753 | 4/1983 | European Pat. Off. | 198/425 |
| 3244013 | 7/1983 | Fed. Rep. of Germany | 198/425 |
| 380635 | 9/1964 | Switzerland | 198/425 |

*Primary Examiner*—Robert J. Spar
*Assistant Examiner*—Kyle K. Kimms
*Attorney, Agent, or Firm*—Spencer & Frank

[57] ABSTRACT

An apparatus for cyclically separating articles in groups, includes a guide floor on which the articles are forwarded in a direction of advance in an edgewise standing orientation to form an article stack of undetermined length thereon; a pickup gate arranged for geing abutted by a leading article in the stack; a separating member arranged for being introduced between two articles of the stack at a predetermined distance from the pickup gate upstream thereof as viewed in the direction of advance for separating a group of articles of predetermined length from the article stack; a driving mechanism for cyclically introducing the separating member between two articles of the stack and moving the pickup gate and the separating member together in a stroke of predetermined length for shifting away the article group situated between the pickup gate and the separating member from the article stack of undetermined length; a first setting mechanism for varying the distance of the separating member from the pickup gate to vary the length of the article groups and a second setting mechanism for altering the position of the guide floor parallel to the direction of advance of the articles.

6 Claims, 2 Drawing Sheets

APPARATUS FOR SEPARATING ARTICLE GROUPS OF VARIABLE LENGTH FROM A STACKED ARTICLE SERIES

BACKGROUND OF THE INVENTION

This invention relates to an apparatus for separating article groups of variable length from a continuous article stack. For determining the desired group length, the apparatus includes a pickup gate arranged for reciprocating motion and a separating device for stopping the continuous article series behind the separated article group.

U.S. Pat. No. 3,037,610 describes a grouping apparatus which finds application in the packaging of biscuits. The flat disc-like or wafer-like articles are advanced in an edgewise upward orientation to a measuring station where the grouping takes place. The grouping is effected either by counting, by length measurement or by weighing. While individual items differ only slightly in weight, their thickness may differ significantly. If solely a length measurement determines the length of the group, the number of items within each group may significantly vary. Nevertheless, grouping by length measurement is desirable because it simplifies the packing operations.

SUMMARY OF THE INVENTION

It is an object of the invention to provide an improved grouping apparatus of the above-outlined type wherein the group length may be varied by simple means.

This object and others to become apparent as the specification progresses, are accomplished by the invention, according to which, briefly stated, there is provided a first setting mechanism included in the drive for the pickup gate and the separating device and a second setting mechanism for shifting a support base for the articles accumulated for grouping.

DESCRIPTION OF THE PREFERRED EMBODIMENT

The flat, disc or wafer-like baked goods emerging from the baking oven in an irregular sequence are, as it is well known in the packaging industry, gathered into a continuous stack formed of edgewise upwardly oriented articles and advanced for further processing as described, for example, in the earlier-noted U.S. Pat. No. 3,037,610.

Figure 1:
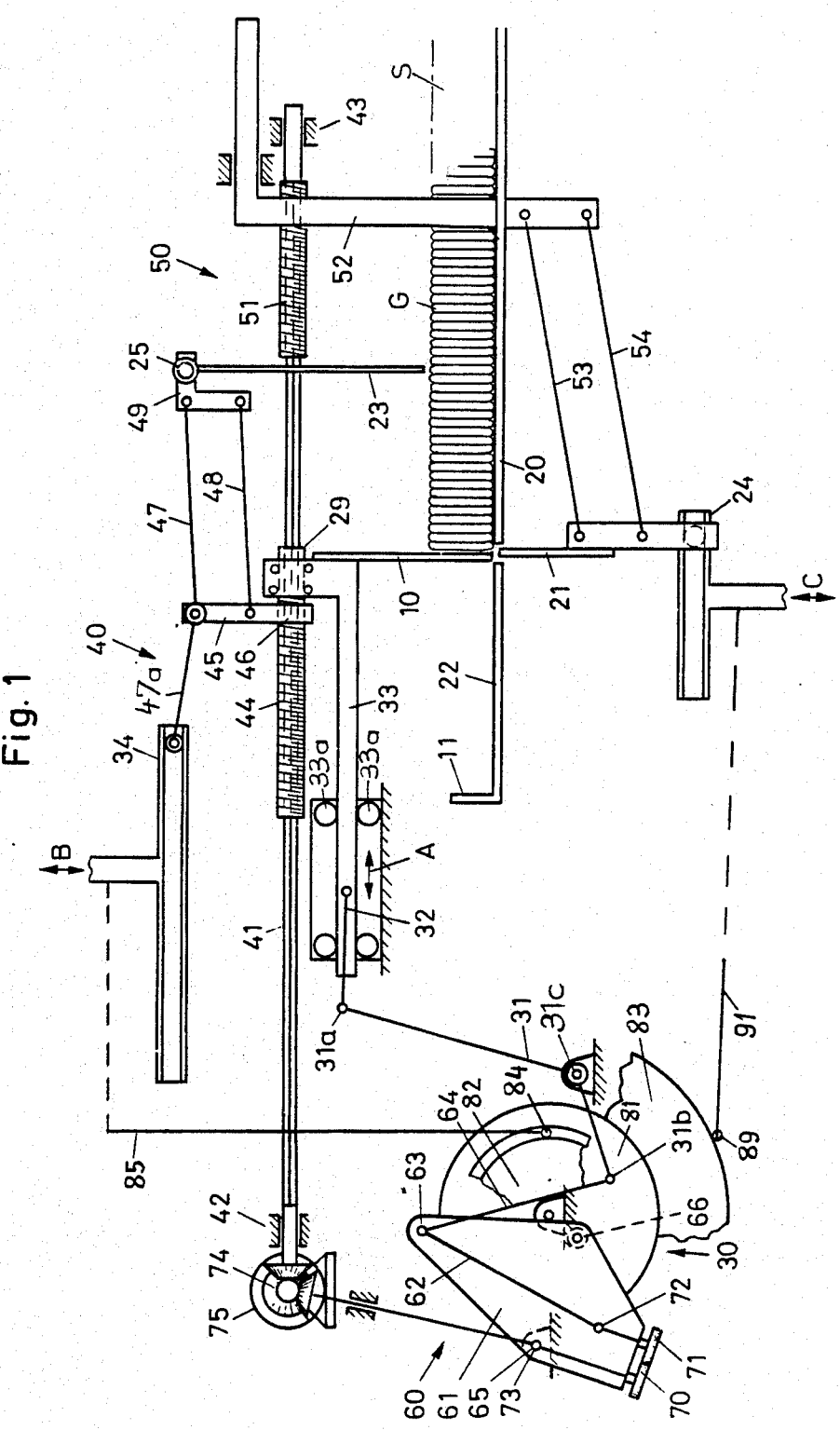
FIG. 1 is a schematic side elevational view of a preferred embodiment of the invention.

Turning now to FIG. 1, the continuous article stack (stream) S abuts, with the leading article, against a face of a pickup gate 10 and thus the article stack accumulates therebehind. A retainer 20 is arranged in the zone in which the pickup gate 10 is located and which is determined by a downstream end of a guide floor 20. As a linear continuation of the guide floor 20, on the other side of the pickup gate 10, there is positioned a receiving floor 22 for further transporting the grouped articles. The receiving floor 22 is shown only symbolically, without its conventional actuating (driving) components. Such an arrangement for a further transport is disclosed, for example, in Swiss Pat. No. 380,635. A separating member 23 is shown in an inoperative position above the stack S of the articles G.

For, for example shortening the length of the article stack to be separated from the article stream S, the separating member 23 has to be shifted with a first setting mechanism 40 towards the left, that is, in the direction of and with respect to the pickup gate 10. The positioning of the leading article of the separated stack with respect to the terminal (retaining) wall 11 of the receiving floor 22 for the desired group length is effected by a second setting mechanism 50 and a third setting mechanism 60. As will be described later, the setting mechanism 50 shifts a downstream terminal length portion of the guide floor 20 towards the left together with the retainer 21 and the separating member 23, while the setting mechanism 60 shortens the jointly executed stroke of the separating member 23 and the pickup gate 10.

For driving the above-described elements in the performance of the cyclical group forming operation, there is provided a cam disc drive generally designated at 30. By means of a first follower roller 66 engaging a first cam disc 30' 81 and carried by a lever 61 pivoted at 65, an angled lever 31 articulated to the machine frame at 31c and a push rod 32 articulated to an end 31a of the angled lever 31, a sled 33 is moved back and forth in the direction of the double-headed arrow A between roller guides 33a. The pickup gate 10 is rigidly affixed to the sled 33.

A horizontal actuating guide rail 34 associated with the separating member 23 is moved vertically in the direction of the double-headed arrow B by means of a second cam disc 82 which is engaged by a follower roller 84 connected to a linkage 85. The connection of the linkage 85 to the guide rail 34 is symbolically shown in broken lines.

A third cam disc 83 which is engaged by a follower roller 89 attached to a linkage 91 effects a vertical displacement, in the direction of the double-headed arrow C, of a horizontal actuating guide rail 24 to which there is connected the retainer 21.

The connection of the linkage 91 to the guide rail 24 is symbolically shown in broken lines.

The three cam discs 81, 82 and 83 may be concentrically secured to a common drive shaft and thus may be rotated in unison by a drive motor (not shown) as it is known for drives of this general type.

The first, second and third setting mechanisms 40, 50 and 60, for adjusting the group length will now be described.

For driving the first setting mechanism 40 and the second setting mechanism 50 there is provided a shaft 41 of square cross section, supported in two bearings 42 and 43 which are stationarily mounted on the machine frame. The first setting mechanism 40 comprises a threaded sleeve 44 which may be shifted on the shaft 41. With its outer thread the sleeve 44 is threaded into an inner thread 46 of a guide bar 45. The sled 33 is, by means of a bearing 29, rotatably supported on the threaded sleeve 44 so that the latter, dependent upon the motion of the sled 33 may also execute a motion in the direction of the arrow A.

By rotating the shaft 41 the distance of the guide bar 45 from the bearing 29 is changed, thereby varying the distance between the pickup gate 10 and the separating member 23.

To the guide bar 45 there are articulated two parallel, spaced rods 47 and 48 whose two other ends are jointed to the carrying bar 49 of the separating member 23. The components 45, 47, 48, 49 form thus a parallelogram linkage drive. The rod 47 has an integral extension 47a connected to the actuating guide rail 34. By virtue of this arrangement the separating member 23 is cyclically introduced between two articles in the article stack S and thereafter withdrawn as the actuating guide rail 34 moves upwardly and then downwardly as shown by the double-headed arrow B. Conventionally, the separating member 23 is mounted on the carrier bar 49 to be pivotal in a vertical plane parallel to the direction of article advance on the guide floor 20 and is positioned by a spiral spring 25 to provide that the separating member 23 may readily deflect if it encounters resistance by impinging on the edge of an article.

In a similar manner the guide floor 20 and the retainer 21 are displaced by means of a further threaded sleeve 51 of the setting mechanism 50. A horizontally displaceable guided holder 52 with which the guide floor 20 is rigidly connected serves for supporting two parallel rods 53 and 54 of a further parallelogram drive for the vertical motion of the retainer 21 during the vertical motion of the horizontal guide rail 24 in the direction of the double-headed arrow C.

Thus, by virtue of a rotary motion of the shaft 41, the separating member 23, the guide floor 20 and the retainer 21 are shifted to an equal extent leftward to reduce the length of the separated article stacks.

The third setting mechanism 60 is provided to ensure that the jointly executed stroke of the pickup gate 10 and the adjusted separating member 23 in the directions A is accordingly adjusted. Also referring to FIG. 2, on a threaded spindle 62 rotatably supported on a pivotal lever 61 there is threaded a travel nut 63 to which a push rod 64 is articulated. The push rod 64 is jointed to the angled lever 31 at 31b. By rotating the threaded spindle 62, the distance between the travel nut 63 and thus the leverage of the push rod 64 at the pivotal lever 61 with respect to the fixed pivot 65 of the pivotal lever 61 changes, so that the constant stroke of the pivotal lever 61 effected by the follower roller 66 causes a stroke of different length of the push rod 64 in case of different starting positions.

Figure 2:
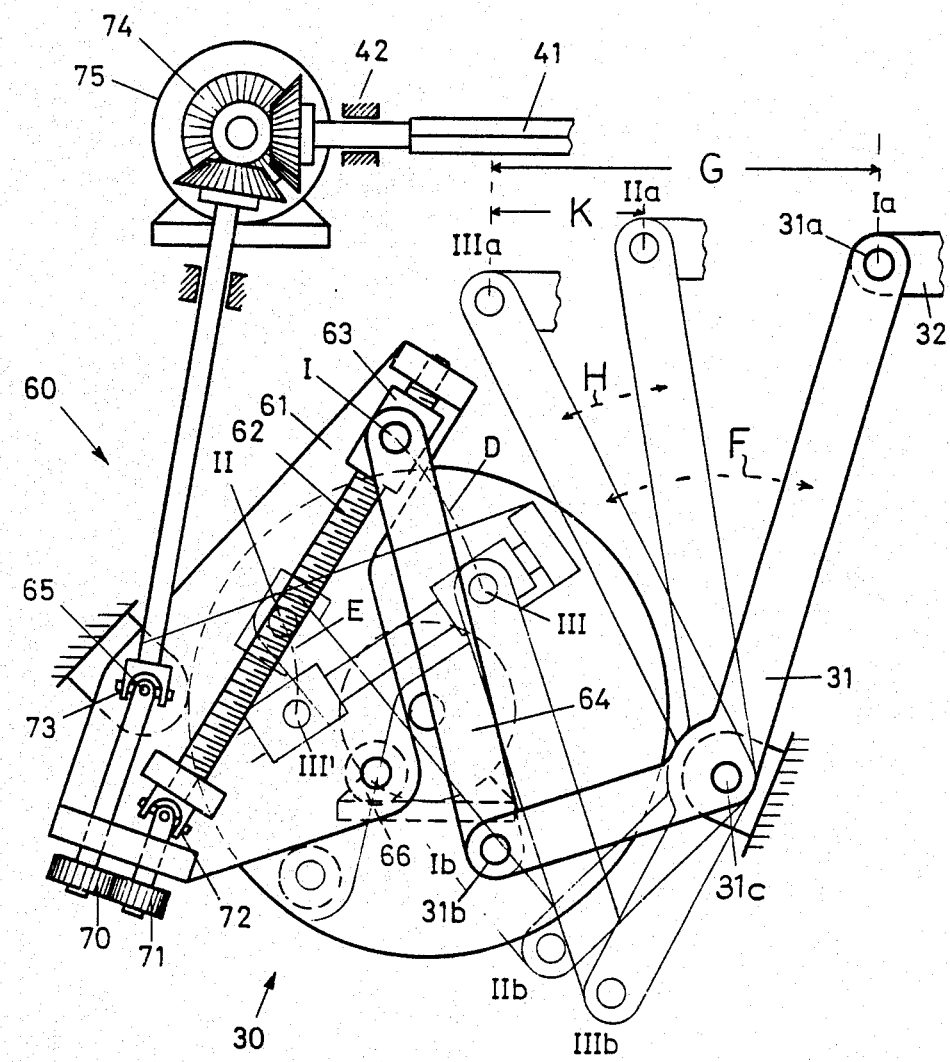
FIG. 2 is an enlarged side elevational view of a detail of the construction shown in FIG. 1.

FIG. 2 shows two arbitrary settings of the travel nut 63 on the threaded spindle 62 to illustrate the resulting differences in the stroke of the push rod 32. In a first setting of the travel nut 63 the latter moves back and forth between points I and III, describing an arc D as the pivotal lever 61 oscillates. As a result, the lever 31 oscillates through an arc F between a right-hand end position Ia, Ib and a left-hand end position IIIa, IIIb. The stroke of the push rod 32 is designated at G. In a selected second position of the travel nut 63 the latter moves back and forth between points II and III', describing an arc E as the pivotal lever 61 executes the same oscillating motion as before. In this case, however, the lever 31 oscillates between a right-hand end position IIa, IIb and the left-hand end position IIIa, IIIb through an arc H. The stroke of the push rod 32 is designated at K. It is seen that stroke K is smaller than stroke G and its forward end position has been displaced towards the left.

By means of two meshing spur gears 70 and 71, two cardan joints 72, 73 and a dual bevel drive 74 all settings may be effected in a simple and accurate manner from a single central location which is symbolically designated as a setting motor 75.

It will be understood that the above description of the present invention is susceptible to various modifications, changes and adaptations, and the same are intended to be comprehended within the meaning and range of equivalents of the appended claims.

What is claimed is:

1. In an apparatus for cyclically separating articles in groups, including a guide floor on which the articles are forwarded in a direction of advance in an edgewise standing orientation to form an article stack of undetermined length thereon; a pickup gate arranged for being abutted by a leading article in the stack; a separating member arranged for being introduced between two articles of the stack at a predetermined distance from said pickup gate upstream thereof as viewed in said direction of advance for separating a group of articles of predetermined length from the article stack; and driving means for cyclically introducing the separating member between said two articles of the stack and moving said pickup gate and said separating member together in a stroke of predetermined length for shifting away the article group situated between the pickup gate and the separating member from the article stack of undetermined length; the improvement comprising
    (a) a first setting means for shifting said separating member for varying the distance of said separating member from said pickup gate to vary the length of the article groups, said first setting means including
        (1) a rotary shaft;
        (2) an externally threaded sleeve torque-transmittingly and axially slidably mounted on said shaft;
        (3) a nut member threadedly received on said sleeve for axial displacement with respect to said sleeve upon rotation of said shaft; said nut member being operatively connected with said separating member for motion of said separating member parallel to said direction of advance relative to said pickup gate upon travel of said nut member relative to said sleeve;
    (b) a second setting means for altering the position of said guide floor parallel to said direction of advance in the sense of shifting of said separating member;
    (c) a third setting means incorporated in said driving means for varying the length of said stroke; and
    (d) a common setting drive means rotatably coupled to said rotary shaft of said first setting means and being operatively connected to said second and third setting means for operating said first, second and third setting means mutually dependent from one another.

2. An apparatus as defined in claim 1, further comprising a bearing member carrying said pickup gate and being mounted on said sleeve; said bearing member being longitudinally immovable relative to said sleeve and being movable therewith as a unit axially with respect to said shaft; said bearing member and said nut member being operatively connected to said driving means for causing said pickup gate and said separating member to execute said stroke.

3. An apparatus as defined in claim 1, wherein said shaft forms part of said second setting means; said second setting means further comprising an additional, externally threaded sleeve torque-transmittingly mounted on said shaft and an additional nut member threadedly mounted on said additional sleeve for axial displacement with respect to said additional sleeve upon rotation of said shaft; said additional nut member being operatively connected to said guide floor for motion of said guide floor parallel to said direction of advance upon travel of said additional nut member relative to said additional sleeve.

4. An apparatus as defined in claim 3, wherein said guide floor has a downstream end; further comprising a retainer means operatively connected to said driving means for reciprocating motion transversely to said direction of advance into and out of a travelling path of the article stack for abutting a leading article of the article stack while said pickup gate is moved away from the article stack with the article group; and means connecting said retainer means to said guide floor for motion with said guide floor as a unit upon travel of said additional nut member relative to said additional sleeve.

5. An apparatus as defined in claim 3, wherein said driving means comprises a driven cam disc, a pivotal drive lever oscillated by the cam disc and having a first location at which said pivotal lever is pivotally supported and a second location; coupling means operatively connecting said pickup gate and said separating member with said drive lever at said second location thereof; said third setting means including means for varying the distance between said first and second locations of said pivotal drive lever for varying the length of the stroke of said pickup gate and said separating member.

6. An apparatus as defined in claim 5, wherein said means for varying the distance between said first and second locations includes a threaded spindle rotatably connected to said common setting drive means and supported on said pivotal drive lever; a travel nut threadedly mounted on said threaded spindle; said coupling means comprising an intermediate lever articulated to said travel nut mounted on said threaded spindle; the location of articulation of said intermediate lever of said coupling means to said travel nut mounted on said spindle constituting said second location.

* * * * *